United States Patent
Kamada et al.

(10) Patent No.: US 12,024,259 B2
(45) Date of Patent: Jul. 2, 2024

(54) VEHICLE

(71) Applicant: YAMAHA HATSUDOKI KABUSHIKI KAISHA, Iwata (JP)

(72) Inventors: Kensuke Kamada, Shizuoka (JP); Tatsuya Tanaka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/104,319

(22) Filed: Feb. 1, 2023

(65) Prior Publication Data
US 2023/0242204 A1 Aug. 3, 2023

(30) Foreign Application Priority Data
Feb. 2, 2022 (JP) .................. 2022-015110

(51) Int. Cl.
| | |
|---|---|
| *B62K 5/01* | (2013.01) |
| *B60G 7/00* | (2006.01) |
| *B60G 7/02* | (2006.01) |
| *B60K 17/16* | (2006.01) |
| *B62D 7/16* | (2006.01) |
| *B62K 5/08* | (2006.01) |

(Continued)

(52) U.S. Cl.
CPC ............... *B62K 5/01* (2013.01); *B60G 7/001* (2013.01); *B60G 7/005* (2013.01); *B60G 7/02* (2013.01); *B60K 17/16* (2013.01); *B62D 7/16* (2013.01); *B62K 5/08* (2013.01); *B62K 25/24* (2013.01); *B62M 7/02* (2013.01); *B62M 17/00* (2013.01)

(58) Field of Classification Search
CPC .......... B60G 7/001; B60G 7/005; B60G 7/02; B62D 7/16; B62D 17/00; B62K 5/08; B62K 5/01; B60K 17/165; B60K 17/16
See application file for complete search history.

(56) References Cited

U.S. PATENT DOCUMENTS

2009/0308682 A1* 12/2009 Ripley ............... B62K 5/08
180/444
2019/0248405 A1 8/2019 Bennett et al.

FOREIGN PATENT DOCUMENTS

| CN | 201530317 U | * | 7/2010 |
|---|---|---|---|
| JP | 3-78691 U | | 8/1991 |

(Continued)

OTHER PUBLICATIONS

Ge, CN-201530317-U, Machine Translation of Specification (Year: 2010).*

*Primary Examiner* — Amy R Weisberg
*Assistant Examiner* — Matthew Joseph Ganci
(74) *Attorney, Agent, or Firm* — Keating & Bennett, LLP

(57) ABSTRACT

A vehicle includes a front differential, a pair of constant-velocity joints, and a steering mechanism. The steering mechanism includes a pitman arm, a pair of tie rods, a pair of first link arms each connecting the pitman arm with a corresponding one of the pair of tie rods, and a pair of second link arms each connecting a corresponding one of the pair of first link arms with a body frame. In a plan view, at least a portion of each constant-velocity joint is located between first and second straight lines extending in a fore-aft direction and through first and second connectors extending between the tie rods and the first link arms. The first connector, the second connector, and at least a portion of each constant-velocity joint are located between third and fourth straight lines extending between the first and second link arms.

15 Claims, 17 Drawing Sheets

(51) Int. Cl.
*B62K 25/24* (2006.01)
*B62M 7/02* (2006.01)
*B62M 17/00* (2006.01)

(56) References Cited

FOREIGN PATENT DOCUMENTS

| | | | |
|---|---|---|---|
| JP | 4-183681 A | 6/1992 | |
| JP | 5-87430 B2 | 12/1993 | |
| JP | 7-165100 A | 6/1995 | |
| JP | 2501522 Y2 | 6/1996 | |
| JP | 4679290 B2 | 4/2011 | |
| JP | 4928924 B2 | 5/2012 | |
| WO | WO-2018142307 A1 * | 8/2018 | ............... B62D 1/14 |

* cited by examiner

VEHICLE

CROSS REFERENCE TO RELATED APPLICATIONS

This application claims the benefit of priority to Japanese Patent Application No. 2022-015110 filed Feb. 2, 2022. The entire contents of this application are hereby incorporated herein by reference.

BACKGROUND OF THE INVENTION

1. Field of the Invention

The present invention relates to vehicles, and more specifically to a vehicle which includes a link-type pitman arm structure.

2. Description of the Related Art

JP-U H3-078691 discloses a steering device for a vehicle as an example which is pertinent to conventional techniques of this kind. The device is for an application to an All Terrain Vehicle, and includes a knuckle for turning a wheel sideways relative to the direction of travel and which is suspended on a body frame via a lower arm and an upper arm displaceable in an up-down direction, and the knuckle is connected with a displacement generating portion which works with a steering shaft and generates a displacement in a widthwise direction of a body of the vehicle via two tie rods (one on the knuckle side and the other on the displacement generating portion side). The two tie rods have their respective connecting portions connected with the body frame via a relay arm. The relay arm and the knuckle are connected with each other by a knuckle-side tie rod of a predetermined length so that a lower arm, an upper arm, and the knuckle-side tie rod all have a substantially equal pivoting radius, with an intent to decrease displacement of the knuckle in its direction of turning with respect to up-down displacement of the lower arm and the upper arm, i.e., to decrease a change in toe-in angle.

However, JP-U H3-078691 discloses nothing about a front differential device and a constant-velocity joint provided in the vicinity thereof, or nothing about means for decreasing the change in the toe-in angle for cases where these components are included.

SUMMARY OF THE INVENTION

Preferred embodiments of the present invention provide vehicles, each including a constant-velocity joint and able to sufficiently decrease a change in a toe-in angle.

According to a preferred embodiment of the present invention, a vehicle includes a body frame, a prime mover supported by the body frame, a pair of front wheels, a front differential to receive power from the prime mover, a pair of constant-velocity joints provided respectively on a left side and a right side of the front differential, a pair of shafts each provided between a corresponding one of the constant-velocity joints and a corresponding one of the front wheels in order to transmit power from the front differential to the pair of front wheels via the pair of constant-velocity joints, a pair of upper arms supported pivotably by the body frame, a pair of lower arms each located lower than a corresponding one of the pair of upper arms and supported pivotably by the body frame, a pair of knuckle arms each connecting a corresponding one of the pair of upper arms and a corresponding one of the pair of lower arms and rotatably supporting a corresponding one of the pair of shafts, and a steering mechanism to steer the pair of front wheels. In this arrangement, the steering mechanism includes a steering shaft, a pitman arm provided at a lower end portion of the steering shaft, a pair of tie rods each connected with a corresponding one of the pair of knuckle arms, a pair of first link arms each connecting the pitman arm with a corresponding one of the pair of tie rods, and a pair of second link arms each connecting a corresponding one of the pair of first link arms with the body frame. In this arrangement, a first connector extends between one of the pair of tie rods and a corresponding one of the pair of first link arms, a second connector extends between the other of the pair of tie rods and a corresponding other of the pair of first link arms, a first straight line extends in a fore-aft direction and through the first connector, a second straight line extends in a fore-aft direction and through the second connector, and each of the pair of constant-velocity joints includes at least a portion thereof located between the first straight line and the second straight line in a plan view of the vehicle.

In a preferred embodiment of the present invention, at least a portion of the pair of constant-velocity joints is located between the first straight line and the second straight line in the plan view, and therefore, it is possible to make a length of the pair of tie rods from the pair of first link arms to the pair of knuckle arms equal or substantially equal to a length of the pair of shafts from the pair of constant-velocity joints to the pair of knuckle arms, or provide a small difference in the lengths between the two. In other words, it is possible to make a pivoting radius of the pair of tie rods around the pair of first link arms equal or substantially equal to a pivoting radius of the pair of shafts around the pair of constant-velocity joints, or provide a small difference in the radii between the two. Therefore, it is possible to make not only the pivoting radius of the pair of tie rods but also the pivoting radius of the pair of shafts, equal or substantially equal to pivoting radii of the pair of upper arms and of the pair of lower arms with respect to the body frame, or provide a small difference in the radii between them. As a result, it is possible to sufficiently decrease the change in the toe-in angle in the vehicle including the pair of constant-velocity joints when a suspension stroke causes the pair of upper arms and the pair of lower arms to pivot with respect to the body frame, and causes the pair of tie rods and the pair of shafts to pivot in the vehicle.

Preferably, a third connector extends between one of the pair of first link arms and a corresponding one of the pair of second link arms, a fourth connector extends between the other of the pair of first link arms and a corresponding other of the pair of second link arms, a fifth connector extends between one of the second link arms and the body frame, a sixth connector extends between the other of the second link arms and the body frame, a third straight line extends through the third connector and the fourth connector, a fourth straight line extends through the fifth connector and the sixth connector, and the first connector, the second connector, and at least a portion of the constant-velocity joints are located between the third straight line and the fourth straight line in the plan view. In this case, it possible to locate the connectors extending between the pair of tie rods and the pair of first link arms near the constant-velocity joint, and therefore, it becomes easy to make the length of the pair of tie rods from the pair of first link arms to the pair of knuckle arms (i.e., the pivoting radius of the tie rods) equal or substantially equal to the lengths of the pair of shafts from the pair of constant-velocity joint to the pair of knuckle arms (i.e., the pivoting radius of the shafts), or provide a small the difference in the length between the two (i.e., in the radii of the two).

Further preferably, a fifth straight line extends in a fore-aft direction and through the third connector, a sixth straight line extends in a fore-aft direction and through the fourth connector, and at least a portion of the front differential is located between the fifth straight line and the sixth straight line in the plan view.

Further, preferably, at least a portion of the front differential is located in a region surrounded by a rectangle defined by vertices represented by the third connector, the fourth connector, the fifth connector, and the sixth connector in the plan view. In this case, the link arm structure and the front differential overlap with each other in the plan view, and it is therefore possible to provide a compact layout in the vehicle's fore-aft direction.

Preferably, the front differential overlaps at least a portion of the steering mechanism in a front view of the vehicle. In this case, it is possible to provide a compact layout.

Further preferably, at least one of the pitman arm, the pair of first link arms, and the pair of second link arms is inclined along an upper surface of the front differential in a side view of the vehicle. In this case, it is possible to provide a compact layout.

Further, preferably, the pair of mounting shafts tilt outward of the vehicle as they extend upward in an arrangement in which the pair of first link arms and the pair of tie rods are respectively connected with each other via the pair of mounting shafts extending in an up-down direction, and the pair of tie rods extend diagonally downward from the pair of first link arms toward the pair of knuckle arms. In this case, the arrangement makes it possible for the pair of tie rods that extend diagonally downward to smoothly pivot around the connectors with the pair of first link arms.

Preferably, a connector extending between one of the pair of upper arms and the body frame, a connector extending between one of the pair of lower arms and the body frame, a connector extending between one of the pair of tie rods and a corresponding one of the pair of first link arms, and one of the pair of constant-velocity joints are located in line in an up-down direction in a front view. In this case, it becomes easy to make the pivoting radii of the tie rod, the shaft, the upper arm, and the lower arm equal or substantially equal to each other, or provide a small difference between the pivoting radii.

Further preferably, the connector extending between the one of the pair of upper arms and the body frame, the connector extending between the one of the pair of tie rods and the corresponding one of the pair of first link arms, one of the pair of constant-velocity joints, and the connector extending between the one of the pair of lower arms and the body frame are located in this order from top to bottom of the vehicle.

Further, preferably, the vehicle further includes a ball joint at a connection between one of the pair of first link arms and a corresponding one of the pair of second link arms in order to absorb an angular tolerance and/or an axial tolerance. In this case, it is possible with the ball joint to absorb at least one of the angular tolerance and the axial tolerance in the connections between the pair of first link arms and the pair of second link arms.

Preferably, the vehicle further includes a metal collar provided at a connection between one of the pair of second link arms and the body frame in order to absorb an angular tolerance and/or an axial tolerance. In this case, it is possible with the metal collar to absorb at least one of the angular tolerance and the axial tolerance in the connection between the pair of second link arms and the body frame.

Further preferably, the body frame includes a front frame, wherein the connectors between the pair of upper arms and the body frame, the connectors between the pair of lower arms and the body frame, the connectors between the pair of tie rods and the pair of first link arms, and the pair of constant-velocity joints are located substantially outward of the front frame in a front view of the vehicle.

Further, preferably, the connector extending between the one of the pair of tie rods and the corresponding one of the pair of first link arms is located at a more forward position than the connector extending between the one of the pair of tie rods and the corresponding one of the pair of knuckle arms, and the connector extending between the one of the pair of tie rods and the corresponding one of the pair of first link arms, and the connector extending between the one of the pair of tie rods and the corresponding one of the pair of knuckle arms are located at a more rearward position than a center of the front wheel. In this case, it becomes possible to provide the vehicle in which the front wheels will assume a compliance toe-out when subjected to a force from ahead. This enables the vehicle to deflect forces from ahead, making it easier to drive the vehicle straightly.

Preferably, at least a portion of the connector extending between the one of the pair of second link arms and the body frame is located at a higher position than a connector extending between the pitman arm and the corresponding one of the pair of first link arms in a side view of the vehicle. In this case, it is possible to provide enough space to locate the front differential below the pitman arm.

Further preferably, the vehicle further includes a straddled seat supported by the body frame, and a bar handle provided at an upper end portion of the steering shaft. A preferred embodiment of the present invention is suitably applied to an ATV (All Terrain Vehicle) as described above.

It should be noted here that the positional relationship of each element in preferred embodiments of the present invention is defined with respect to the posture of a vehicle on a horizontal plane with no operator or passengers onboard.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
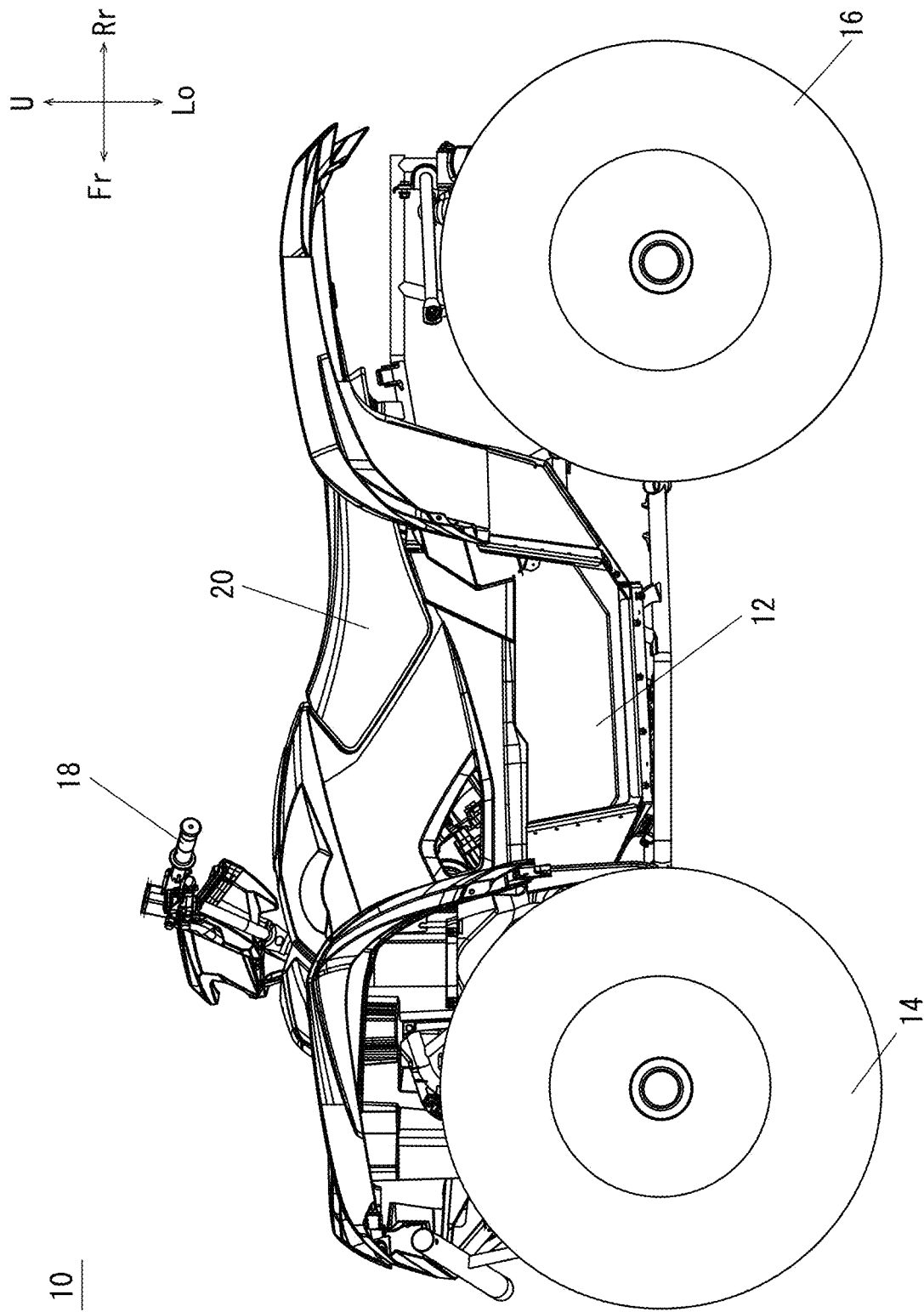
FIG. 1 is a side view which shows a vehicle according to a preferred embodiment of the present invention.

Hereinafter, preferred embodiments of the present invention will be described with reference to the drawings.

In the drawings, "Fr" indicates forward, "Rr" indicates rearward, "R" indicates rightward, "L" indicates leftward, "U" indicates upward, and "Lo" indicates downward.

Figure 2:
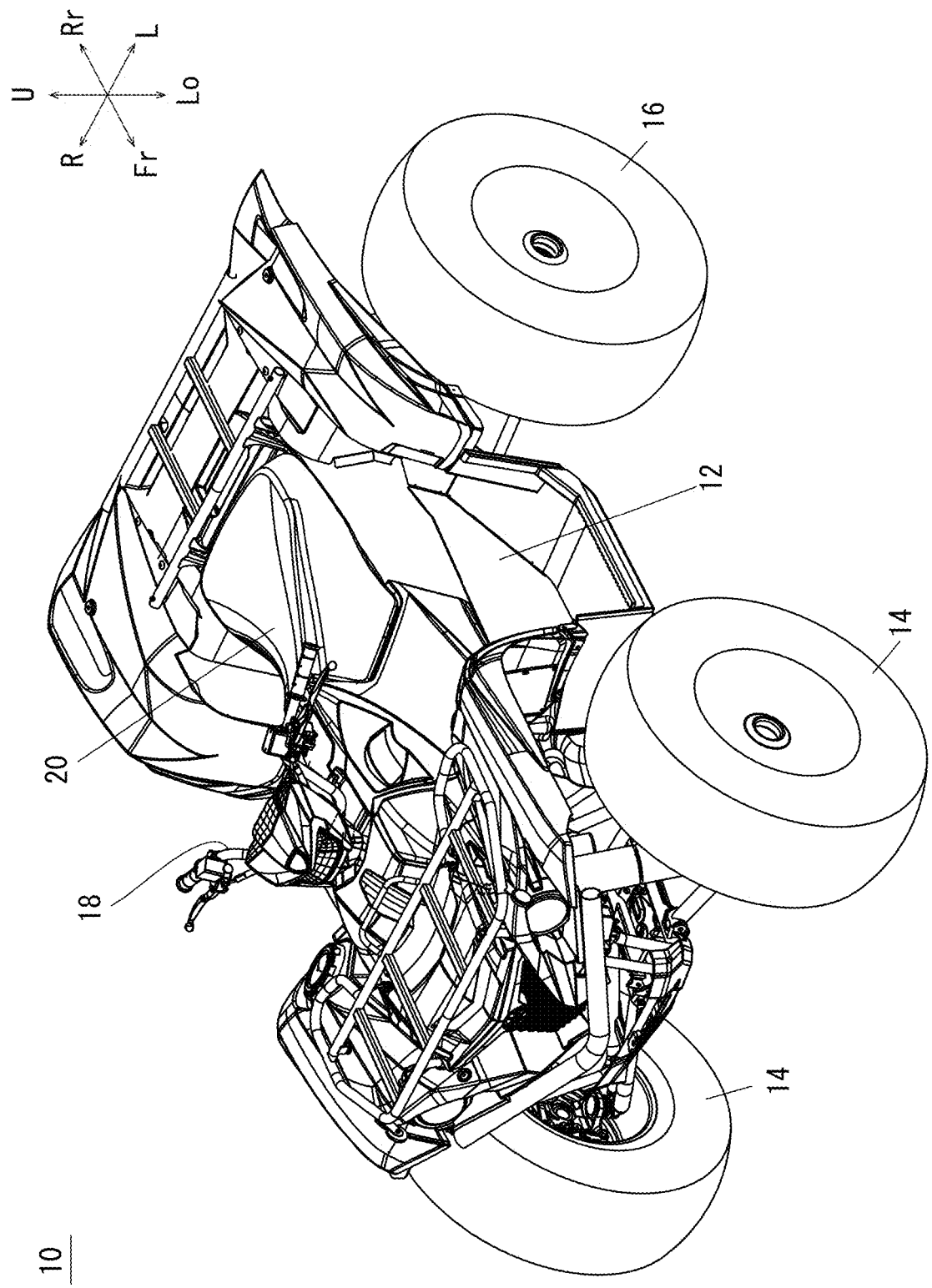
FIG. 2 is a perspective view which shows the vehicle in FIG. 1.

Referring to FIG. 1 and FIG. 2, a vehicle 10 according to a preferred embodiment of the present invention is a straddled vehicle, and more specifically a four-wheeled ATV, which includes a body 12, a pair of front wheels 14, a pair of rear wheels 16, a bar handle 18 provided in the body 12, and a saddle-style seat 20 supported by the body 12. Note that FIG. 2 shows only one of the pair of rear wheels 16. The bar handle 18 is provided in an intermediate region in the vehicle's widthwise direction, at an upper end portion of a steering shaft portion 72 (which will be described below), above the front wheels 14 in a side view. The saddle-style seat 20 is provided at an intermediate portion in the vehicle's width direction, at a higher position than the front wheels 14 and the rear wheels 16 in a side view, between the front wheels 14 and the rear wheels 16, and is supported by a body frame 22.

Figure 3:
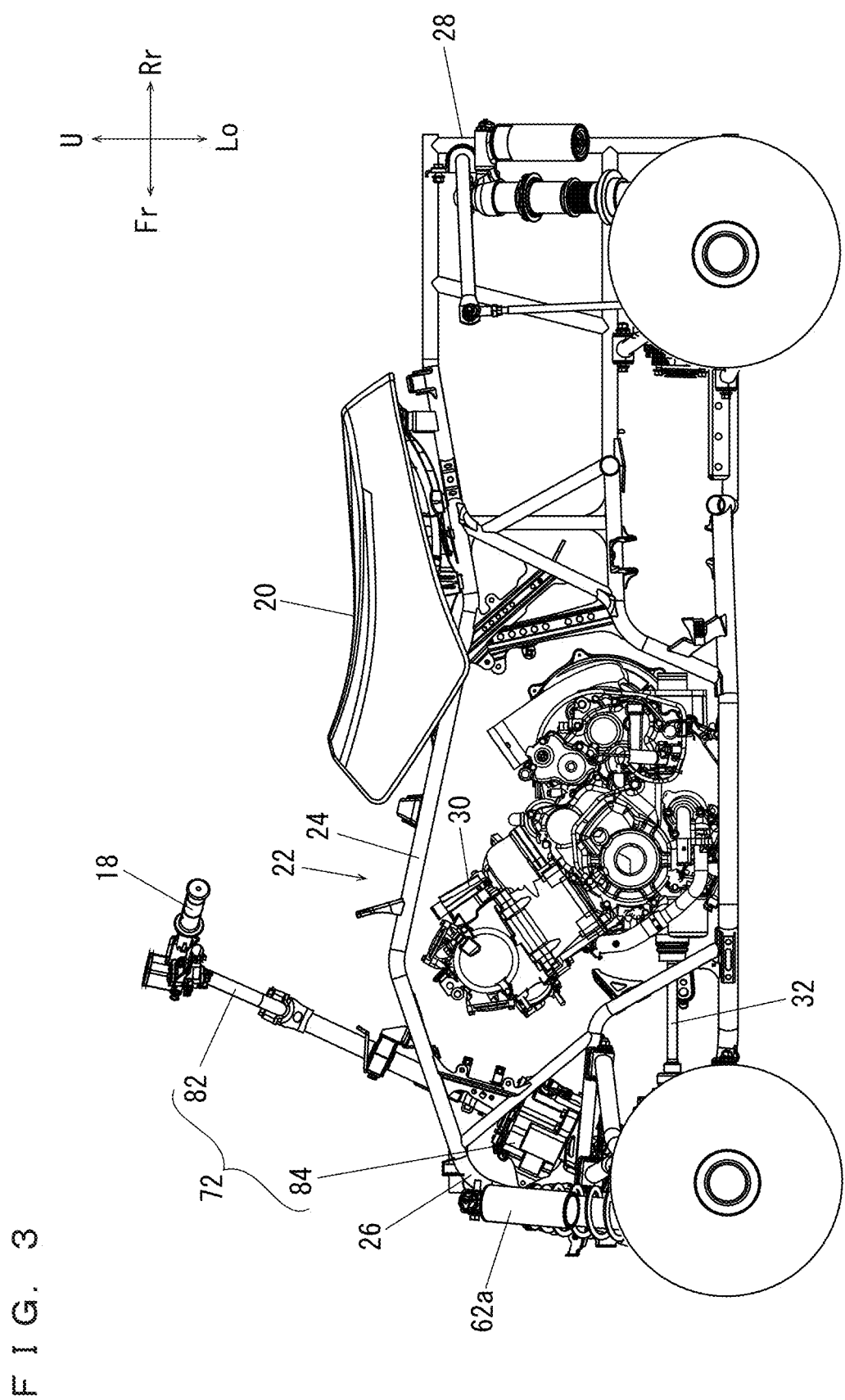
FIG. 3 is a side view which shows a body frame and the surroundings thereof.

Referring to FIG. 3, the body 12 includes a body frame 22.

The body frame 22 includes a main frame 24, a front frame 26 provided at a front portion of the main frame 24, and a rear frame 28 provided at a rear portion of the main frame 24.

Figure 4:
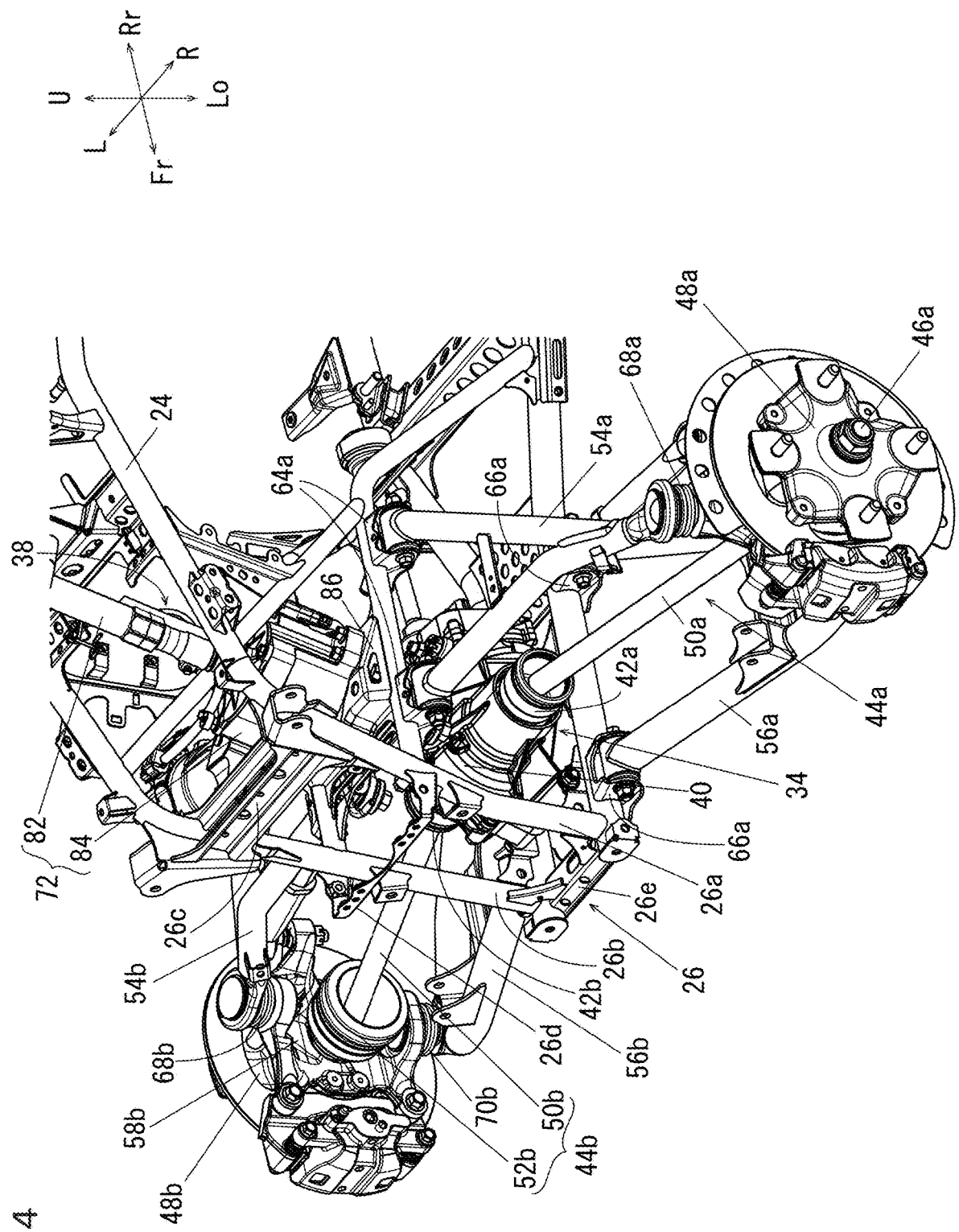
FIG. 4 is a perspective view which shows a front frame and the surroundings thereof.
Figure 5:
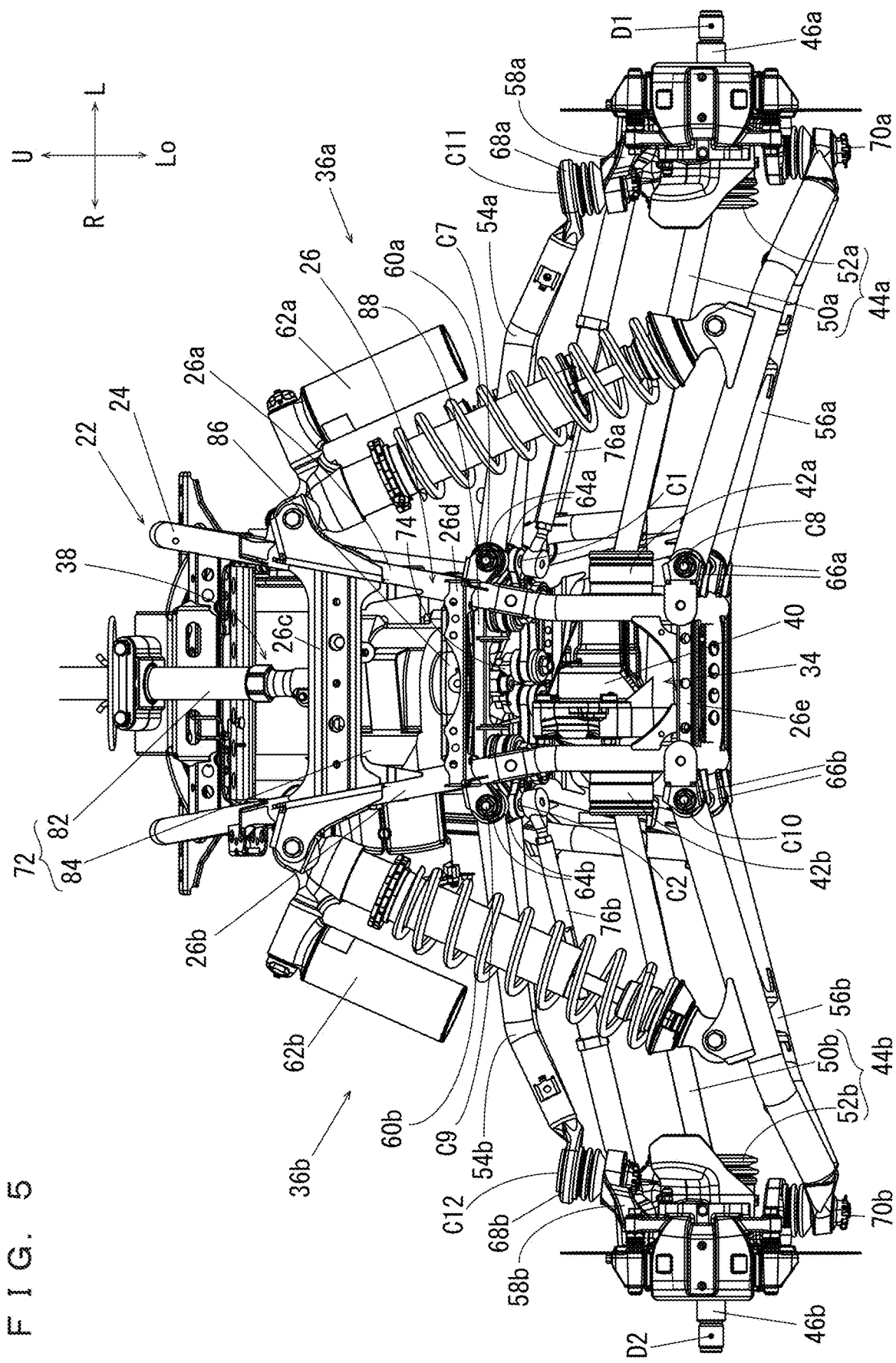
FIG. 5 is a front view which shows the front frame and the surroundings thereof.

Referring to FIG. 4 and FIG. 5, the front frame 26 includes a pair of front frame portions 26a, 26b extending in an up-down direction. The pair of front frame portions 26a, 26b include upper portions fastened to each other by a cross member 26c. The pair of front frame portions 26a, 26b have their center portions fastened to each other by a cross member 26d. The pair of front frame portions 26a, 26b have their lower end portions fastened to each other by a cross member 26e.

Referring to FIG. 3 through FIG. 5, the vehicle 10 further includes an engine 30 as a prime mover, a propeller shaft 32 extending forward from a lower end portion of the engine 30, a rotation transmission portion 34 to transmit rotation from the engine 30 via the propeller shaft 32 to the pair of front wheels 14, a pair of suspensions 36a, 36b suspending the pair of front wheels 14, and a steering mechanism 38 to steer the pair of front wheels 14.

The engine 30 is supported by the main frame 24 of the body frame 22. The engine 30 is located slightly forward than a center region in a fore-aft direction of the main frame 24, and tilts forward.

Figure 6:
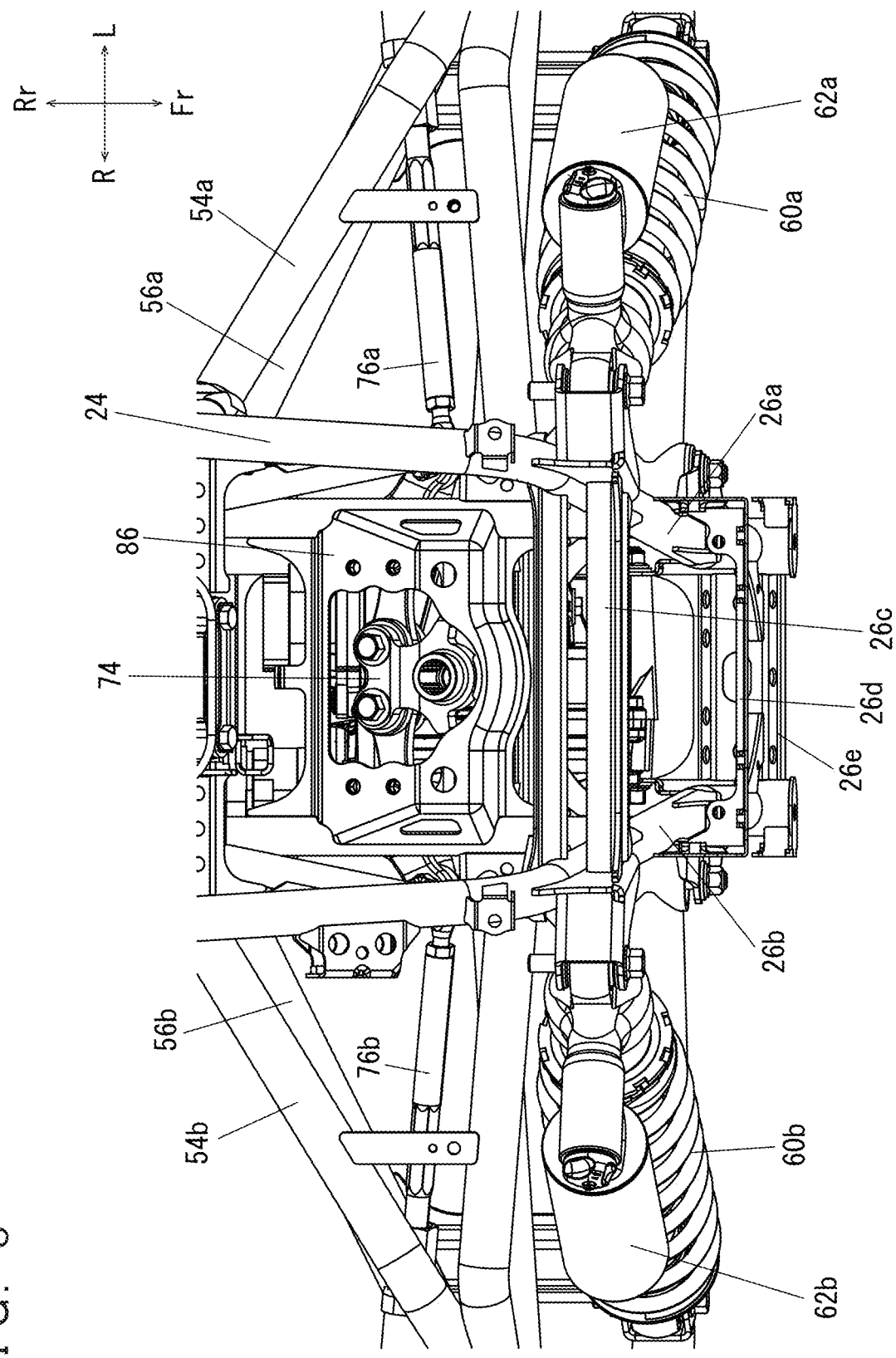
FIG. 6 is a plan view which shows the front frame and the surroundings thereof.
Figure 7:
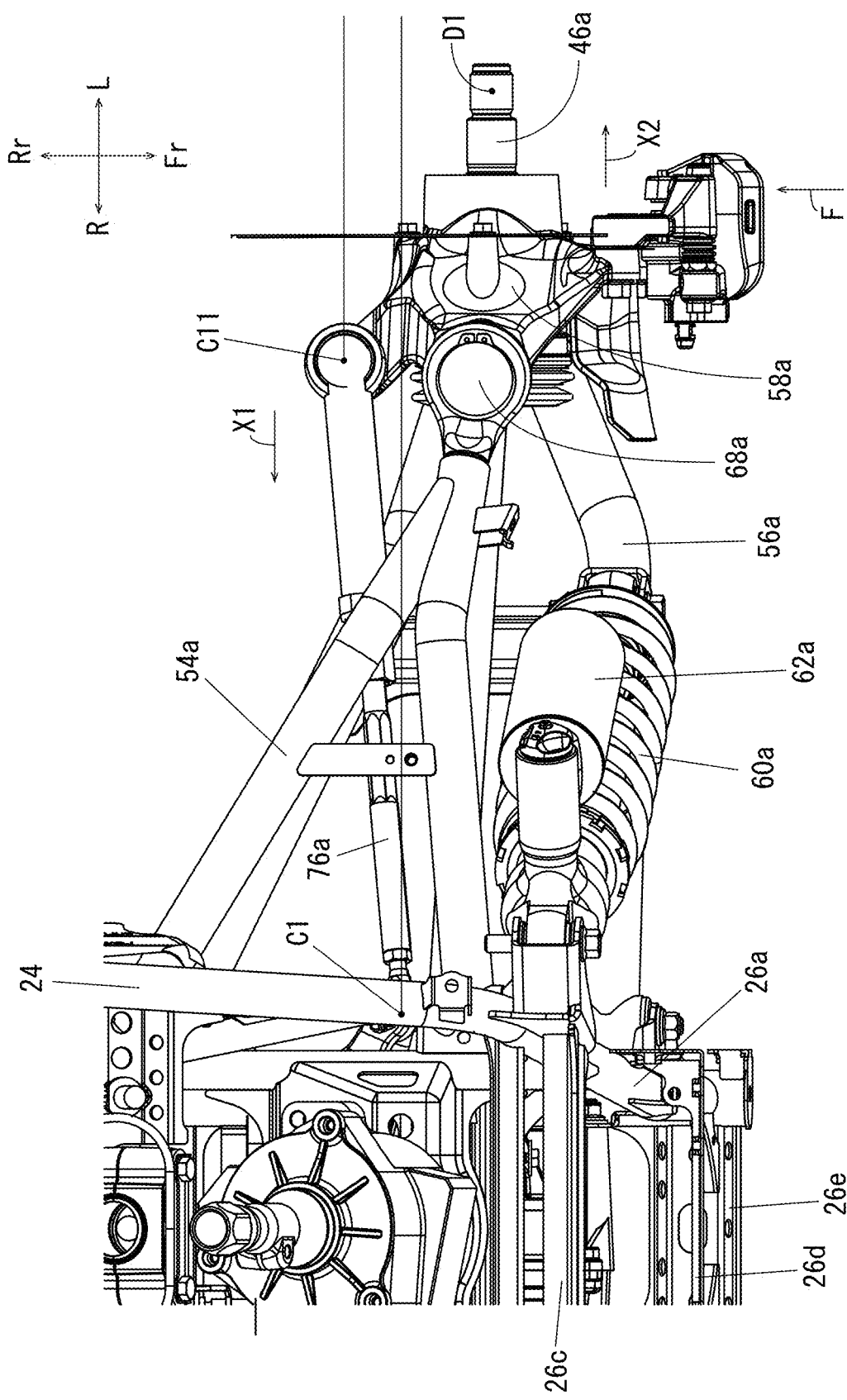
FIG. 7 is a plan view which shows the front frame and a surrounding structure on a left side thereof.
Figure 8:
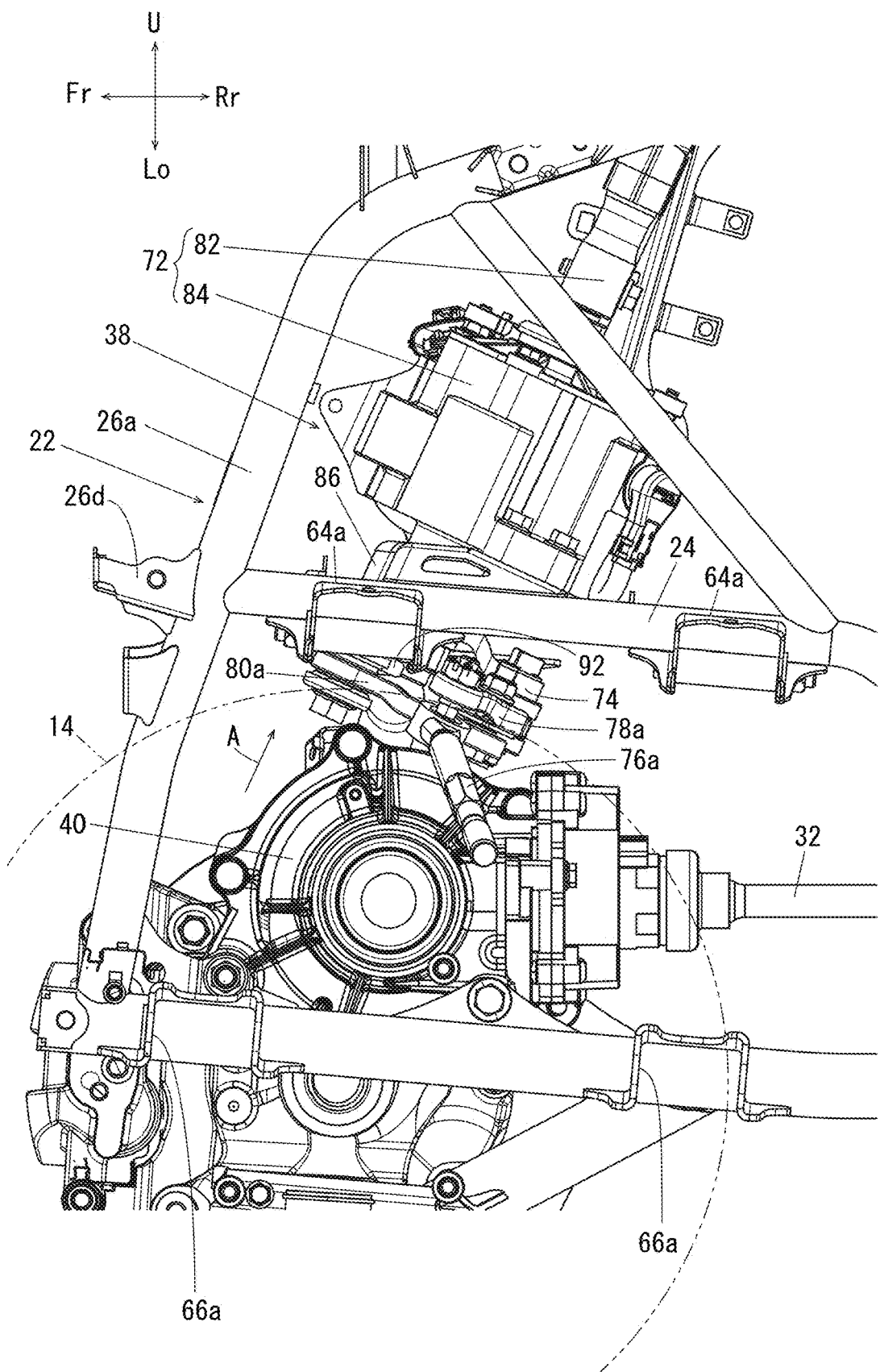
FIG. 8 is a side view taken from a left side which shows the front frame and the surroundings thereof.

Referring also to FIG. 6 through FIG. 8, the rotation transmission portion 34 includes a front differential device 40, a pair of constant-velocity joints 42a, 42b, a pair of shaft portions 44a, 44b, a pair of axles 46a, 46b, and a pair of hubs 48a, 48b.

The front differential device 40 is located at a rearward region of the front frame 26, and supported by the main frame 24. The front differential device 40 is connected with the engine 30 via the propeller shaft 32, and power from the engine 30 is transmitted to the front differential device 40.

The pair of constant-velocity joints 42a, 42b are provided near or in a vicinity of, respectively, left and right sides of the front differential device 40.

The pair of shaft portions 44a, 44b, the pair of axles 46a, 46b, and the pair of hubs 48a, 48b are provided between the pair of constant-velocity joints 42a, 42b and the pair of the front wheels 14. In other words, the shaft portion 44a, the axle 46a, and the hub 48a are provided between the constant-velocity joint 42a and the one of the front wheels 14 to transmit power from the front differential device 40 to one of the front wheels 14 via the constant-velocity joint 42a; and the shaft portion 44b, the axle 46b, and the hub 48b are provided between the constant-velocity joint 42b and the other of the front wheels 14 to transmit power from the front differential device 40 to the other of the front wheels 14 via the constant-velocity joint 42.

The shaft portion 44a includes a drive shaft 50a and a constant-velocity joint 52a. The drive shaft 50a extends in a left-right direction to connect the constant-velocity joint 42a and the constant-velocity joint 52a with each other. The constant-velocity joint 52a and the axle 46a are connected with each other and rotatably supported by a knuckle arm 58a (which will be described below). The axle 46a has one of the front wheels 14 (left front wheel in the present preferred embodiment) attached thereto via the hub 48a.

The shaft portion 44b is left-right symmetrical with and configured the same as the shaft portion 44a, and includes a drive shaft 50b and a constant-velocity joint 52b. The drive shaft 50b extends in a left-right direction to connect the constant-velocity joint 42b and the constant-velocity joint 52b with each other. The constant-velocity joint 52b and the axle 46b are connected with each other and rotatably supported by a knuckle arm 58b (which will be described below). The axle 46b has one of the front wheels 14 (right front wheel in the present preferred embodiment) attached thereto via the hub 48b.

The pair of suspensions 36a, 36b are provided between the pair of front wheels 14 and the body frame 22 in order to suspend the pair of front wheels 14. In the present preferred embodiment, the suspensions 36a, 36b are a double wishbone type, for example.

The suspensions 36a, 36b are provided at a front portion of the body frame 22.

The suspension 36a includes an upper arm 54a, a lower arm 56a, a knuckle arm 58a, a shock absorber 60a, and a coil spring 62a. Likewise, the suspension 36b includes an upper arm 54b, a lower arm 56b, a knuckle arm 58b, a shock absorber 60b, and a coil spring 62b.

The upper arms 54a, 54b and the lower arms 56a, 56a are a A-type arms, for example.

The pair of upper arms 54a, 54b and the pair of lower arms 56a, 56b are pivotably supported by the main frame 24 in an up-down direction near the front frame 26. Each of the lower arms 56a, 56b is located at a lower position than the corresponding of one of the upper arms 54a, 54b. More specifically, with reference to FIG. 4, FIG. 8, and FIG. 9, the body frame 22 further includes two brackets 64a and two brackets 66a provided on the left side of the main frame 24, and two brackets 64b and two brackets 66b provided on the right side of the main frame 24. The upper arm 54a is connected pivotably with the main frame 24 via the two brackets 64a. The upper arm 54b is connected pivotably with the main frame 24 via the two brackets 64b. The lower arm 56a is connected pivotably with the main frame 24 via the two brackets 66a. The lower arm 56b is connected pivotably with the main frame 24 via the two brackets 66b.

Returning to FIG. 5, the knuckle arm 58a is provided between the upper arm 54a and the lower arm 56a. In other words, the upper arm 54a and the lower arm 56a are connected with each other via the knuckle arm 58a. More specifically, the upper arm 54a and the lower arm 56a are connected with the knuckle arm 58a via ball joints 68a, 70a, respectively. This makes the upper arm 54a and the lower arm 56a pivotable in an up-down direction with respect to the knuckle arm 58a. Also, this makes the knuckle arm 58a pivotable in a fore-aft direction with respect to the upper arm 54a and the lower arm 56a. The knuckle arm 58a rotatably supports the shaft portion 44a.

Likewise, the knuckle arm 58b is provided between the upper arm 54b and the lower arm 56b. In other words, the upper arm 54b and the lower arm 56b are connected with each other via the knuckle arm 58b. More specifically, the upper arm 54b and the lower arm 56b are connected with the knuckle arm 58b via ball joints 68b, 70b, respectively. This makes the upper arm 54b and the lower arm 56b pivotable in an up-down direction with respect to the knuckle arm 58b. Also, this makes the knuckle arm 58b pivotable in a fore-aft direction with respect to the upper arm 54b and the lower arm 56b. The knuckle arm 58b rotatably supports the shaft portion 44b.

The shock absorbers 60a, 60b have their lower end portions supported pivotably in a left-right direction by the lower arms 56a, 56b, respectively. The shock absorbers 60a, 60b have their upper end portions supported pivotably in a left-right direction by upper end portions, respectively, of the front frame portions 26a, 26b of the front frame 26.

Figure 9:
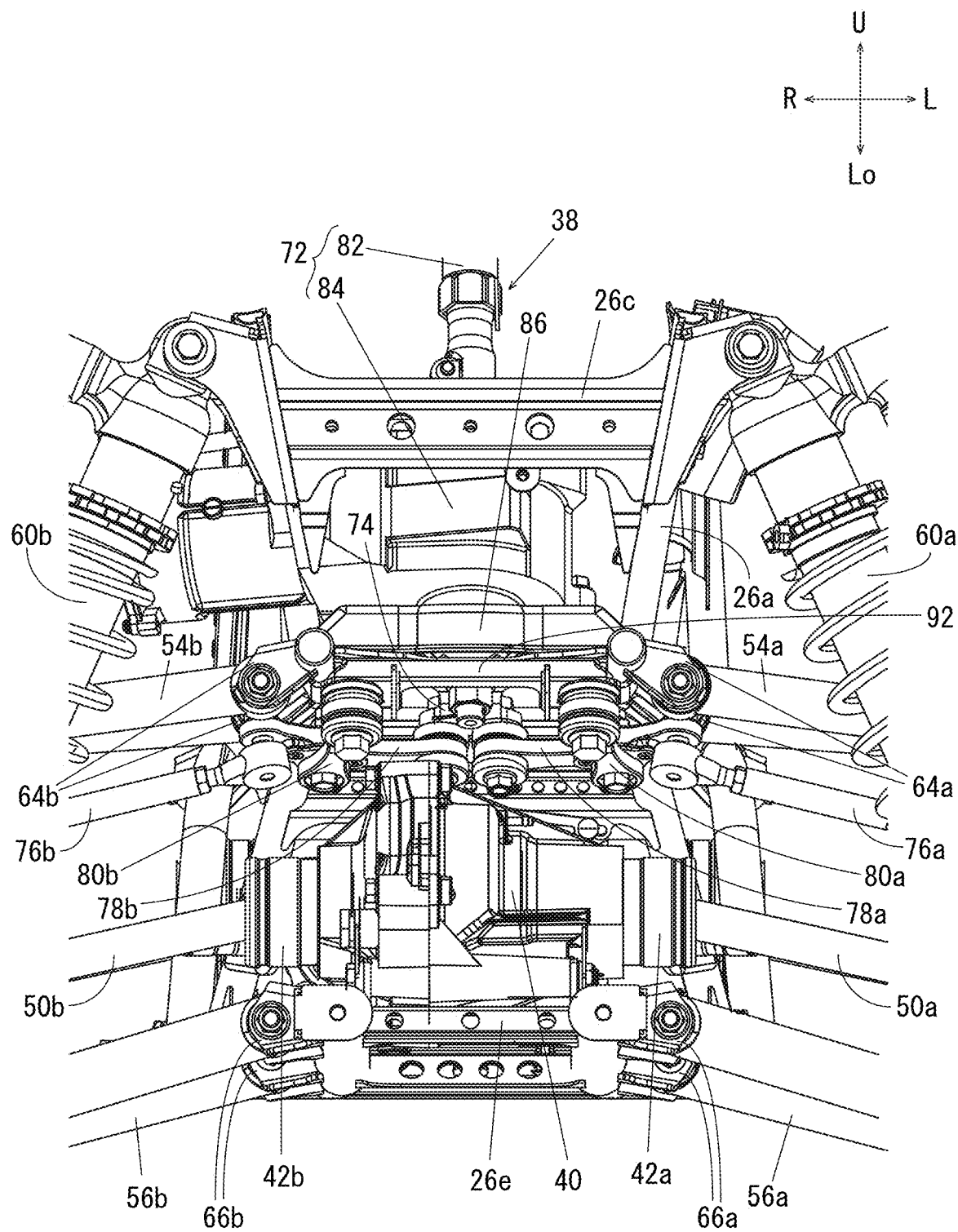
FIG. 9 is a front view which shows a front differential device, a pitman arm, and other elements.

Referring to FIG. 5, FIG. 8, and FIG. 9, the steering mechanism 38 is supported by the main frame 24. The steering mechanism 38 includes a steering shaft portion 72, a pitman arm 74, a pair of tie rods 76a, 76b, a pair of first link arms 78a, 78b, and a pair of second link arms 80a, 80b.

The steering shaft portion 72 includes a steering shaft 82, and an electric power steering (EPS) 84 provided on the steering shaft 82. The steering shaft 82 is provided near a front portion of the main frame 24. The electric power steering 84 is supported by the main frame 24 via a bracket 86.

Figure 10:
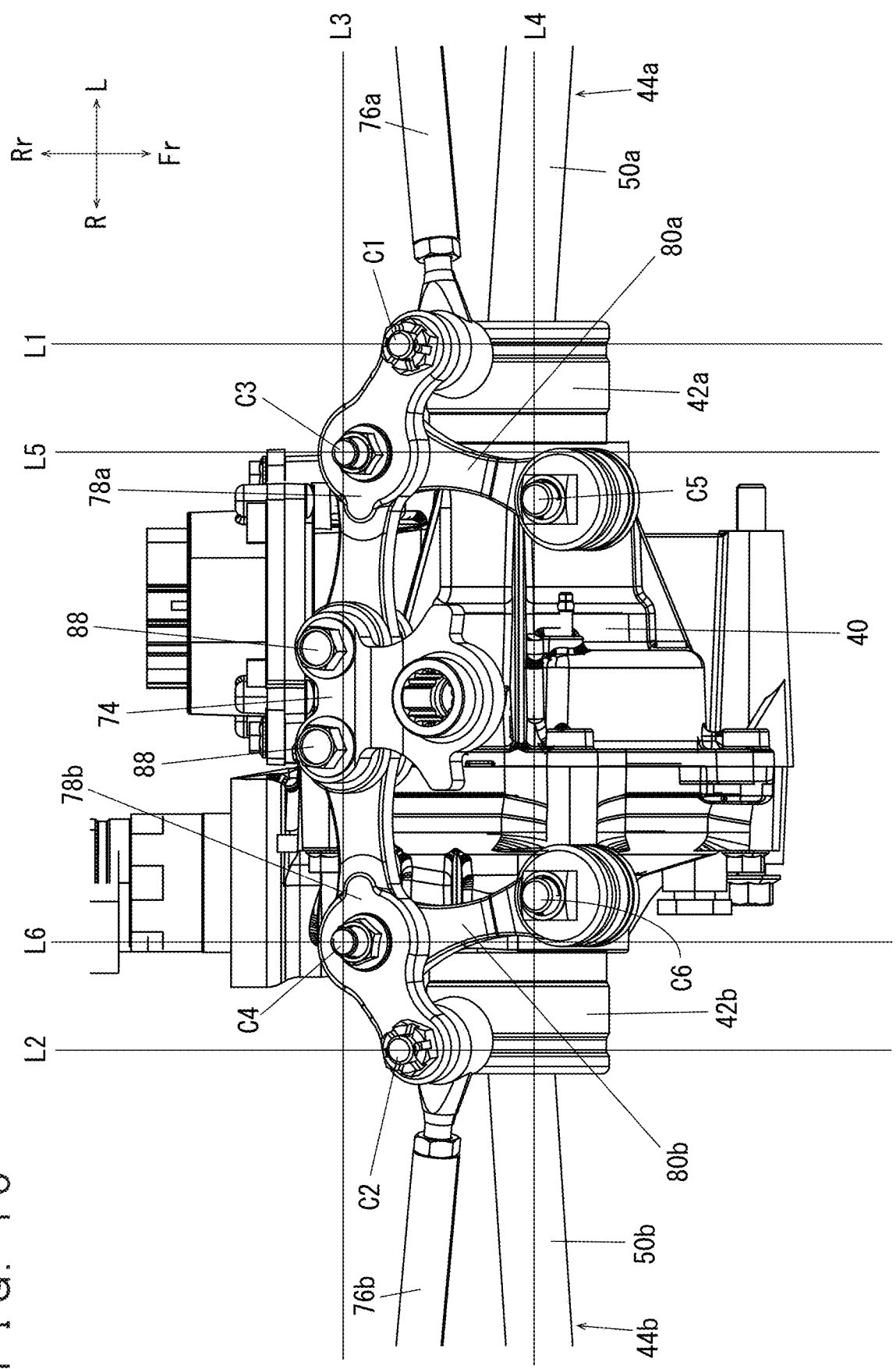
FIG. 10 is a plan view which shows the front differential device, the pitman arm, and other elements.
Figure 11:
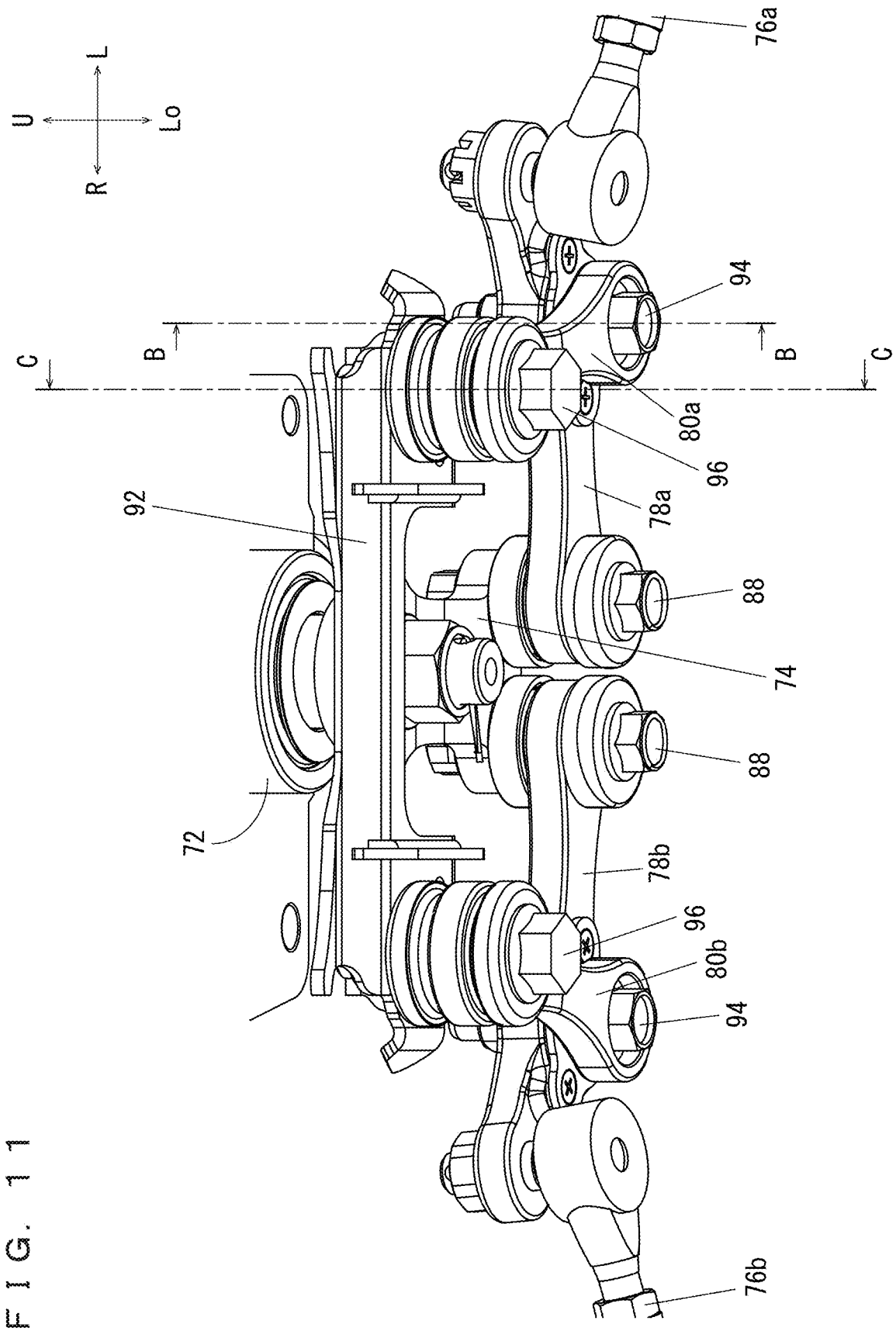
FIG. 11 is a front view which shows the pitman arm and other elements.

Referring also to FIG. 10 and FIG. 11, the pitman arm 74 is provided at a lower end portion of the steering shaft portion 72.

The tie rod 76a is connected with the corresponding knuckle arm 58a, and the tie rod 76b is connected with the corresponding knuckle arm 58b.

The pair of first link arms 78a, 78b connect the pitman arm 74 with their respective, corresponding tie rods 76a, 76b. The pitman arm 74 and the tie rod 76a are connected pivotably with the first link arm 78a. The pitman arm 74 and the tie rod 76b are connected pivotably with the first link arm 78b.

The pitman arm 74 is connected with the first link arm 78a by a connecting member 88, and is connected with the first link arm 78b by a connecting member 88.

Figure 12:
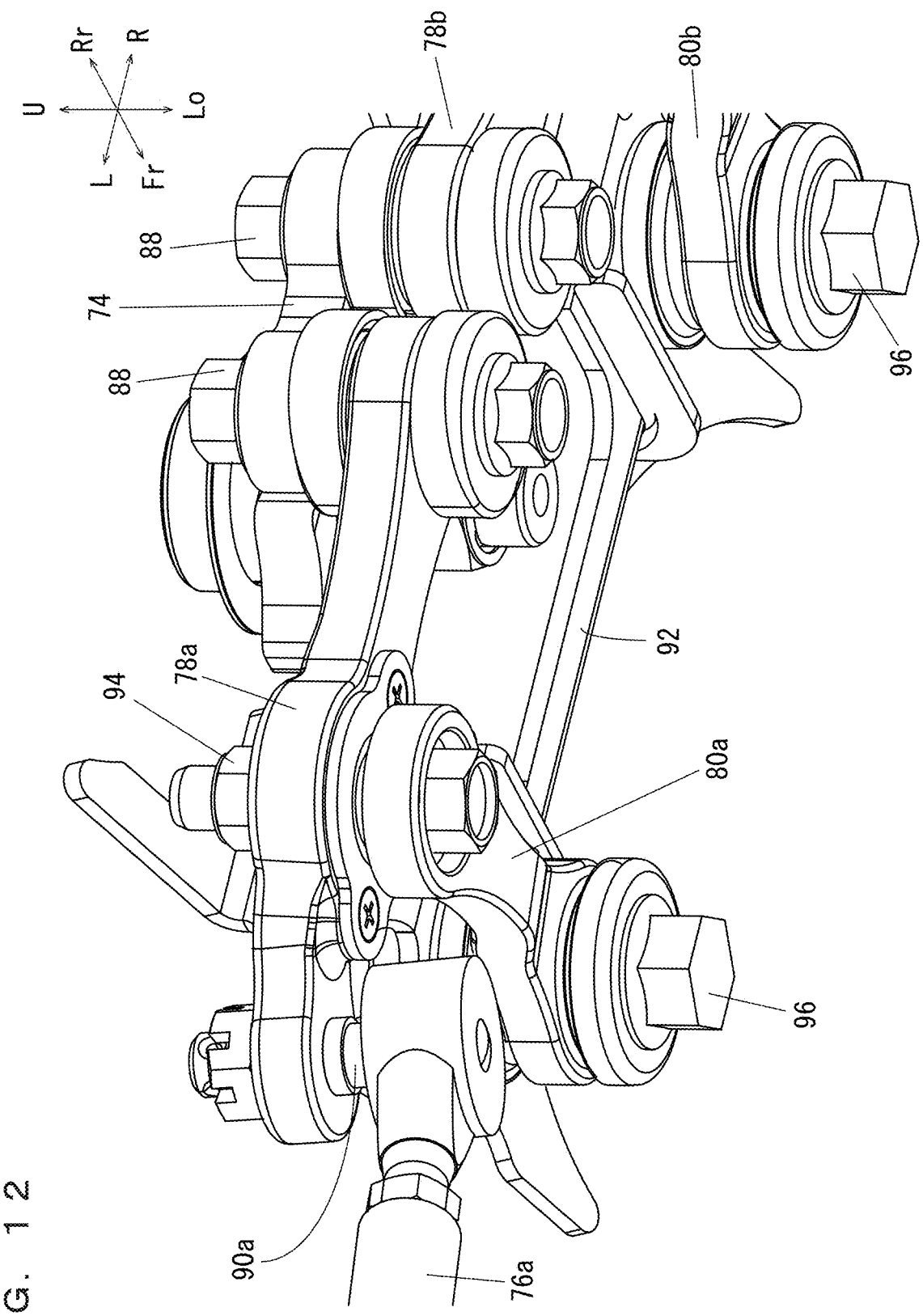
FIG. 12 is a rear perspective view which shows the pitman arm and other elements.
Figure 13:
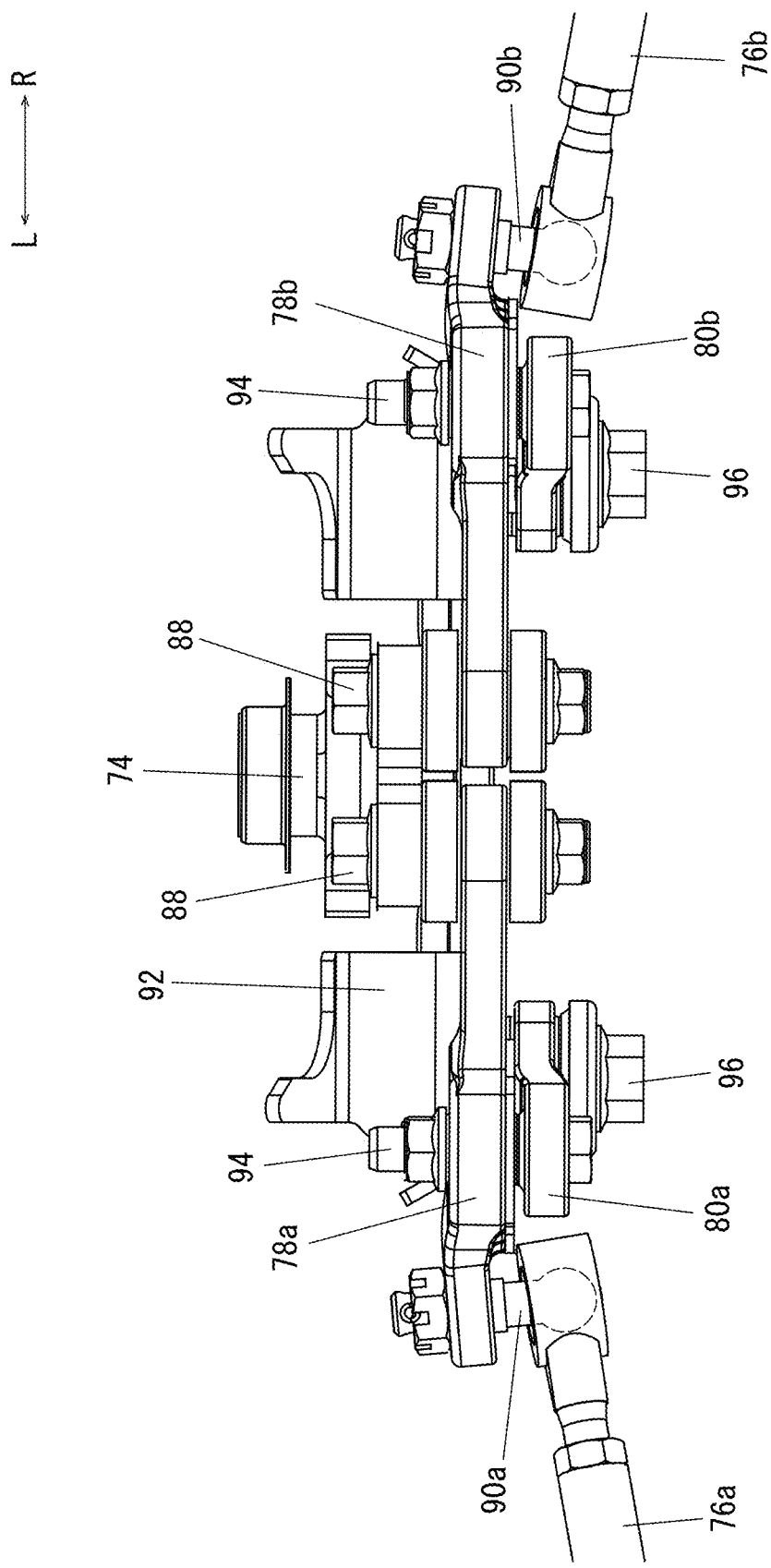
FIG. 13 is a view when the pitman arm and others are viewed from rear.

Referring also to FIG. 12 and FIG. 13, the first link arms 78a, 78b and the tie rods 76a, 76b are connected with each other via mounting shafts 90a, 90b extending in an up-down direction. The tie rods 76a, 76b respectively extend diagonally downward from the first link arms 78a, 78b toward the knuckle arms 58a, 58b. The mounting shafts 90a, 90b tilt to face outward of the vehicle as they extend upward. In the present preferred embodiment, the mounting shafts 90a, 90b also tilt rearward slightly. End portions of the mounting shaft 90a and of the tie rod 76a, and end portions of the mounting shaft 90b and of the tie rod 76b function as ball joints, respectively.

Figure 14:
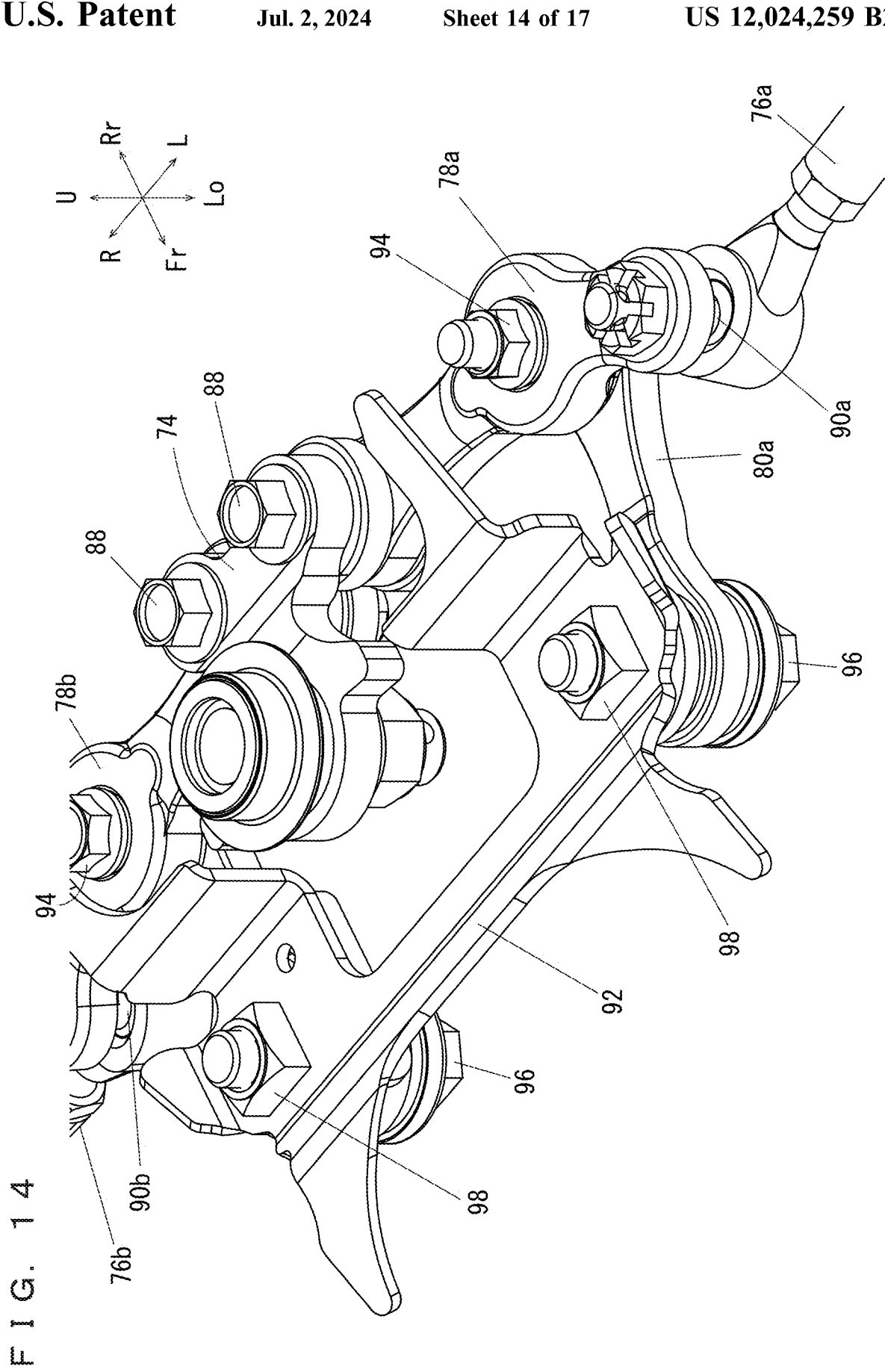
FIG. 14 is a front perspective view which shows the pitman arm and other elements.
Figure 15:
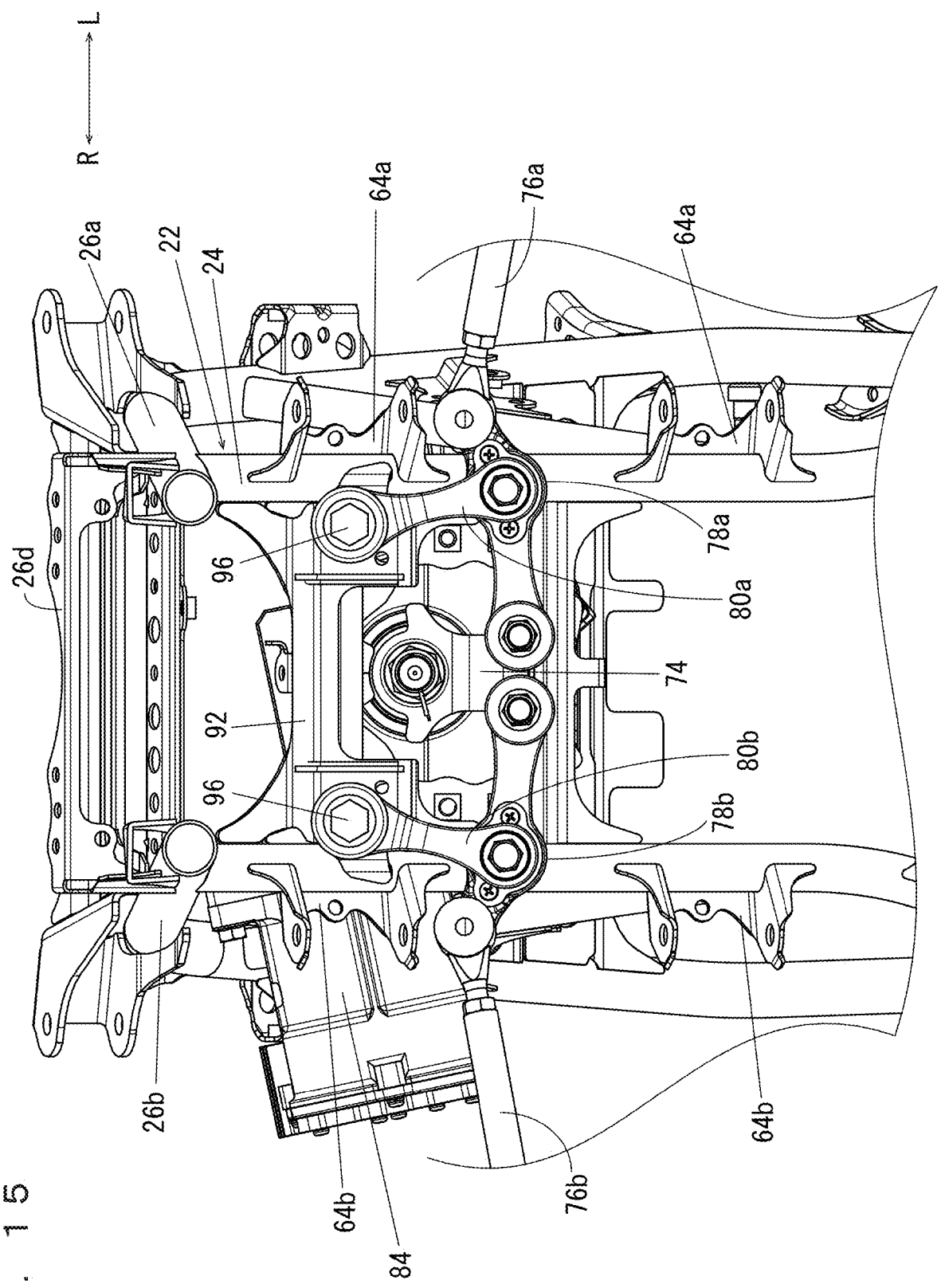
FIG. 15 is a view of the pitman arm and the surroundings thereof when viewed from a direction indicated by Arrow A (see FIG. 8) which is from a direction of a steering shaft and from the bottom of the vehicle.

Referring also to FIG. 14 and FIG. 15, the pair of second link arms 80a, 80b connect the first link arms 78a, 78b with the body frame 22. More specifically, the second link arm 80a connects an intermediate portion of the first link arm 78a with the body frame 22, and the second link arm 80b connects an intermediate portion of the first link arm 78b with the body frame 22. The first link arms 78a, 78b are respectively pivotably connected with the second link arms 80a, 80b. The body frame 22 further includes a plate member 92 connected with the main frame 24. The plate member 92 is welded, for example, to the main frame 24. The pair of second link arms 80a, 80b are connected with each other via the plate member 92, and connected with the main frame 24 via the plate member 92.

Figure 16:
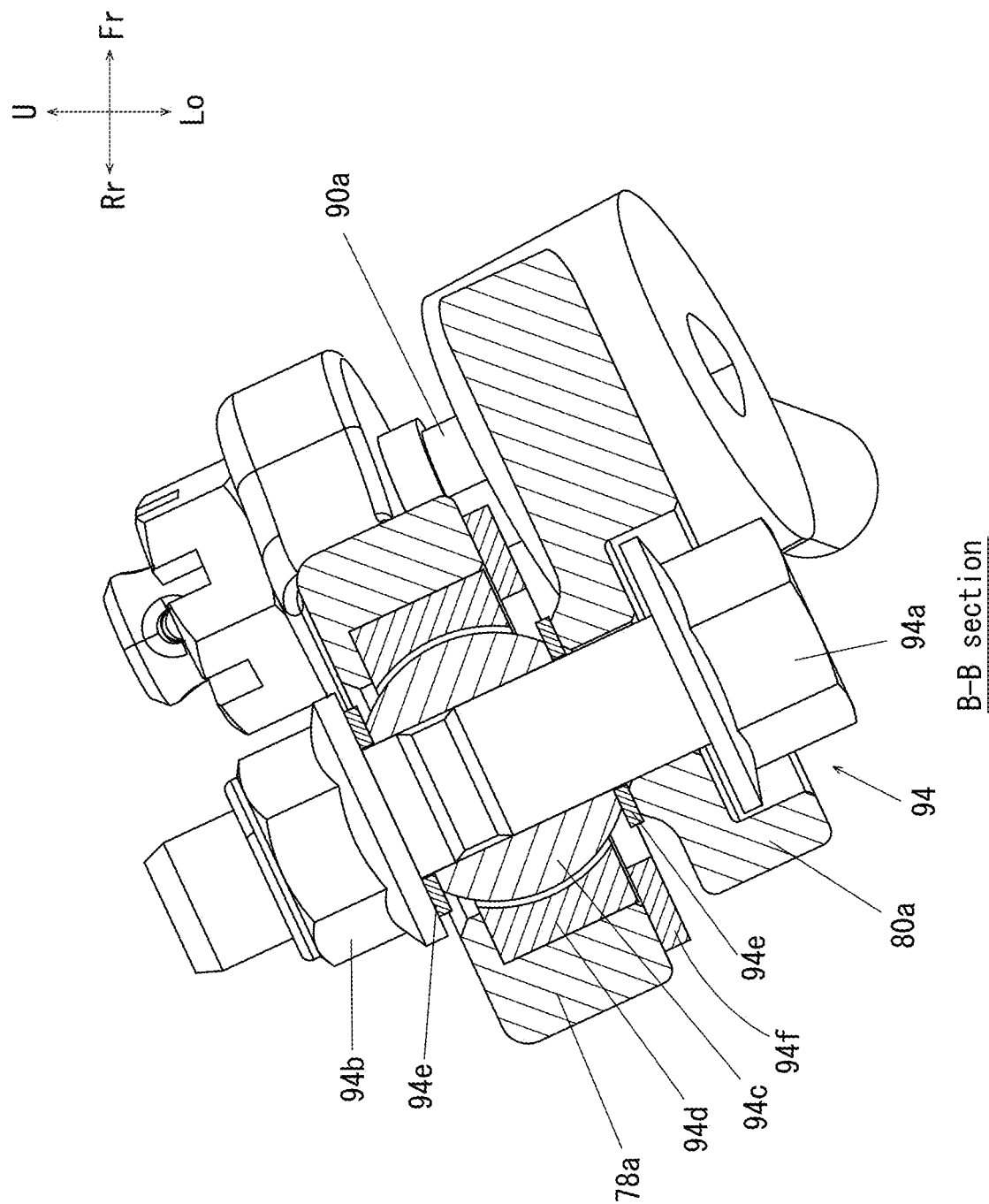
FIG. 16 is a sectional view taken in a line B-B.

Referring to FIG. 16, the first link arm 78a and the second link arm 80a are connected with each other by a ball joint 94. The ball joint 94 includes a bolt 94a, a nut 94b, a ball-shaped portion 94c, a ball seat 94d, two washers 94e, and a plate member 94f. The first link arm 78a and the second link arm 80a are connected with each other by the bolt 94a and the nut 94b, with the ball-shaped portion 94c and the two washers 94e fitted to the bolt 94a. The ball seat 94d is fitted into the first link arm 78a to face the ball-shaped portion 94c. The plate member 94f is provided between the first link arm 78a and the second link arm 80a in order to prevent the ball seat 94d from moving out of alignment. As described above, the ball joint 94 is provided at the place of connection between the first link arm 78a and the second link arm 80a in order to absorb angular tolerance and/or axial tolerance. Likewise, a ball joint 94 is provided at the place of connection between the first link arm 78b and the second link arm 80b.

Figure 17:
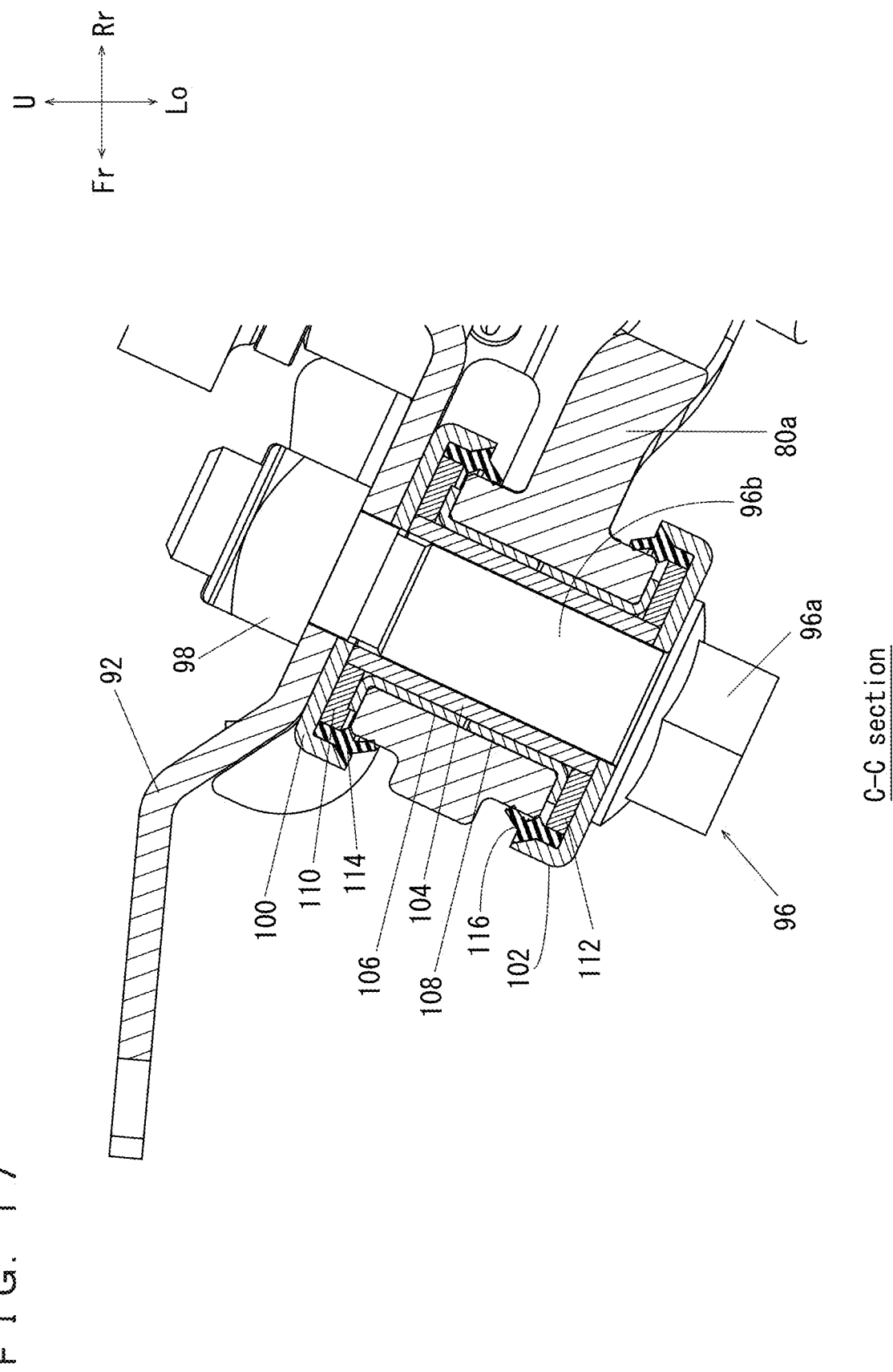
FIG. 17 is a sectional view taken in a line C-C.

Referring to FIG. 17, the second link arm 80a is connected with the plate member 92 with a bolt 96 and a nut 98. In this arrangement, metal collars 100, 102 are provided respectively between an upper surface of the second link arm 80a and the plate member 92, and between a lower surface of the second link arm 80a and a head portion 96a of the bolt 96. A cylindrical collar 104 and housings 106, 108 are placed between a body portion 96b of the bolt 96 and the second link arm 80a. Also, washers 110, 112 are provided respectively between the metal collar 100 and the housing 106, and between the metal collar 102 and the housing 108. Further, inside the metal collars 100, 102, there are provided annular elastic members 114, 116 made of rubber, for example, in order to prevent the second link arm 80a from moving out of alignment. As described above, the metal collars 100, 102 are provided at the places of connection between the second link arm 80a and the body frame 22 (the plate member 92) in order to absorb angular tolerance and/or axial tolerance. Likewise, the metal collars 100, 102 are provided at the places of connection between the second link arm 80b and the body frame 22 (the plate member 92).

Returning to FIG. 10, assume that in a plan view, a connecting portion between the tie rod 76a and the first link arm 78a will be called a first connecting portion C1, a connecting portion between the tie rod 76b and the first link arm 78b will be called a second connecting portion C2, a straight line extending in a fore-aft direction and extending through first connecting portion C1 will be called a first straight line L1, a straight line extending in a fore-aft direction and extending through second connecting portion C2 will be called a second straight line L2, then each of the constant-velocity joints 42a, 42b includes at least a portion thereof located between the first straight line L1 and the second straight line L2.

In a plan view, assume that a connecting portion between the first link arm 78a and the second link arm 80a will be called a third connecting portion C3, a connecting portion between the first link arm 78b and the second link arm 80b will be called a fourth connecting portion C4, a connecting portion between the second link arm 80a and the body frame 22 will be called a fifth connecting portion C5, a connecting portion between the second link arm 80b and the body frame 22 will be called a sixth connecting portion C6, a straight line extending through third connecting portion C3 and the fourth connecting portion C4 will be called a third straight line L3, and a straight line extending through fifth connecting portion C5 and the sixth connecting portion C6 will be called a fourth straight line L4, then the first connecting portion C1, the second connecting portion C2, and at least a portion of each of the constant-velocity joints 42a, 42b are located between the third straight line L3 and the fourth straight line L4.

In a plan view, assume that a straight line extending in a fore-aft direction and extending through third connecting portion C3 will be called a fifth straight line L5, and a straight line extending in a fore-aft direction and extending through fourth connecting portion C4 will be called a sixth straight line L6, then at least a portion of the front differential device 40 is located between the fifth straight line L5 and the sixth straight line L6.

In a plan view, at least a portion of the front differential device 40 is located in a region surrounded by a rectangle defined by vertices represented by the third connecting portion C3, the fourth connecting portion C4, the fifth connecting portion C5, and the sixth connecting portion C6.

Returning to FIG. 5, in a front view, the front differential device 40 overlaps at least a portion of the steering mechanism 38.

In a front view, a connecting portion C7 between the upper arm 54a and the body frame 22, a connecting portion C8 between the lower arm 56a and the body frame 22, a connecting portion (the first connecting portion C1) between tie rod 76a and the first link arm 78a, and the constant-velocity joint 42a are located in line in an up-down direction. In other words, they are substantially on a straight line in a front view, i.e., they are substantially lined up, even if they are slightly out of alignment. Likewise, in a front view, a connecting portion C9 between the upper arm 54b and the body frame 22, a connecting portion C10 between the lower arm 56b and the body frame 22, the connecting portion (the second connecting portion C2) between tie rod 76b and the first link arm 78b, and the constant-velocity joint 42b are located in line in an up-down direction. In other words, they are substantially on a straight line in a front view, i.e., they are substantially lined up, even if they are slightly out of alignment.

Also, the connecting portion C7 between the upper arm 54a and the body frame 22, the connecting portion (the first connecting portion C1) between the tie rod 76a and the first link arm 78a, the constant-velocity joint 42a, and the connecting portion C8 between the lower arm 56a and the body frame 22 are located in this order from top to bottom.

Likewise, the connecting portion C9 between the upper arm 54b and the body frame 22, the connecting portion (the second connecting portion C2) between the tie rod 76b and the first link arm 78b, the constant-velocity joint 42b, and the connecting portion C10 between the lower arm 56b and the body frame 22 are located in this order from top to bottom.

In a front view, the connecting portions C7, C9 between the upper arms 54a, 54b and the body frame 22, the connecting portions C8, C10 between the lower arms 56a, 56b and the body frame 22, the connecting portions (the first connecting portion C1 and the second connecting portion C2) between the tie rods 76a, 76b and the first link arms 78a, 78b, and the constant-velocity joints 42a, 42b are located substantially outward or outside of the front frame 26. However, for the constant-velocity joints 42a, 42b, at least their outer end portions should be located outward of the front frame 26 in a front view, i.e., other portions thereof may be located inward of the front frame 26.

Referring to FIG. 8, in a side view, the pitman arm 74, the first link arms 78a, 78b, and the second link arms 80a, 80b incline (i.e., are not in parallel with a horizontal plane but are tilted) along an upper surface of the front differential device 40. Also, in a side view, at least a portion of the connecting portion between the second link arms 80a, 80b and the body frame 22 (the plate member 92) is located at a higher position than the connecting portion between the pitman arm 74 and the first link arms 78a, 78b.

Referring to FIG. 5 and FIG. 7, the connecting portion (the first connecting portion C1) between the tie rod 76a and the first link arm 78a is located at a more forward position than a connecting portion C11 between the tie rod 76a and the knuckle arm 58a. The connecting portion (the first connecting portion C1) between the tie rod 76a and the first link arm 78a, and the connecting portion C11 between the tie rod 76a and the knuckle arm 58a are located at a more rearward position than a center D1 of the left front wheel 14. In the configuration as described thus far, when the front wheels 14 receive a force indicated by Arrow F from ahead, a rear portion of the knuckle arm 58a is pulled inward by the tie rod 76a as indicated by Arrow X1, causing a front portion of the knuckle arm 58a to move outward as indicated by Arrow X2. Likewise, the connecting portion (the second connecting portion C2) between the tie rod 76b and the first link arm 78b is located at a more forward position than a connecting portion C12 between the tie rod 76b and the knuckle arm 58b. The connecting portion (the second connecting portion C2) between the tie rod 76b and the first link arm 78b, and the connecting portion C12 between the tie rod 76b and the knuckle arm 58b are located at a more rearward position than a center D2 of the right front wheel 14.

According to the vehicle 10 as described thus far, at least a portion of the respective constant-velocity joints 42a, 42b are located between the first straight line L1 and the second straight line L2 in a plan view, and therefore, it is possible to make a length of the tie rod 76a (76b) from the first link arm 78a (78b) to the knuckle arm 58a (58b) equal or substantially equal to a length of the shaft portion 44a (44b) from the constant-velocity joint 42a (42b) to the knuckle arm 58a (58b), or provide a small difference in the length between the two. In other words, it is possible to make a pivoting radius of the tie rod 76a (76b) around the first link arm 78a (78b) equal or substantially equal to a pivoting radius of the shaft portion 44a (44b) around the constant-velocity joint 42a (42b), or provide a small difference in the radius between the two. Therefore, it is possible to make, not only the pivoting radius of the tie rod 76a (76b) but also the pivoting radius of the shaft portion 44a (44b) equal or substantially equal to pivoting radii of the upper arm 54*a* (54*b*) and of the lower arm 56*a* (56*b*) with respect to the body frame 22, or provide a small difference in the radius between them. As a result, it is possible to sufficiently decrease the change in the toe-in angle in the vehicle 10 using the constant-velocity joints 42*a*, 42*b*, when a suspension stroke causes the upper arm 54*a* (54*b*) and the lower arm 56*a* (56*b*) to pivot with respect to the body frame 22 and causes the tie rod 76*a* (76*b*) and the shaft portion 44*a* (44*b*) to pivot in the vehicle.

In a plan view, the first connecting portion C1, the second connecting portion C2, and at least a portion of the respective constant-velocity joints 42*a*, 42*b* are located between the third straight line L3 and the fourth straight line L4. This makes it possible to locate the connecting portion between the tie rod 76*a* (76*b*) and the first link arm 78*a* (78*b*) near the constant-velocity joint 42*a* (42*b*), and therefore, it becomes easy to make the length of the tie rod 76*a* (76*b*) from the first link arm 78*a* (78*b*) to the knuckle arm 58*a* (58*b*) (i.e., the pivoting radius of the tie rod 76*a* (76*b*)) equal or substantially equal to the length of the shaft portion 44*a* (44*b*) from the constant-velocity joint 42*a* (42*b*) to the knuckle arm 58*a* (58*b*) (i.e., the pivoting radius of the shaft portion 44*a* (44*b*)), or provide a small the difference in the length between the two (i.e., in the radii of the two).

In a plan view, at least a portion of the front differential device 40 is located in a region surrounded by a rectangle defined by vertices represented by the third connecting portion C3, the fourth connecting portion C4, the fifth connecting portion C5, and the sixth connecting portion C6. This means that the link arm structure and the front differential device 40 are located to overlap with each other in a plan view, and it is therefore possible to make layout compact in the vehicle's fore-aft direction.

In a front view, the front differential device 40 overlaps at least a portion of the steering mechanism 38. Therefore, it is possible to provide a compact layout.

In a side view, the pitman arm 74, the first link arms 78*a*, 78*b*, and the second link arms 80*a*, 80*b* incline along an upper surface of the front differential device 40. Therefore, it is possible to provide a compact layout.

The tie rod 76*a* (76*b*) extends diagonally downward from the first link arm 78*a* (78*b*) toward the knuckle arm 58*a* (58*b*), and the mounting shaft 90*a* (90*b*) tilts to face outward of the vehicle as it extends upward. The arrangement makes it possible for the tie rod 76*a* (76*b*) that extends diagonally downward to smoothly pivot around its connecting portion with the first link arm 78*a* (78*b*). In other words, it is possible to widely utilize the pivoting angle of the ball joint provided by the mounting shaft 90*a* (90*b*) and the end portion of the tie rod 76*a* (76*b*).

In a front view, the connecting portion C7 (C9) between the upper arm 54*a* (54*b*) and the body frame 22, the connecting portion C8 (C10) between the lower arm 56*a* (56*b*) and the body frame 22, the connecting portion (the first connecting portion C1 (the second connecting portion C2)) between the tie rod 76*a* (76*b*) and the first link arm 78*a* (78*b*), and the constant-velocity joint 42*a* (42*b*) are located in line in an up-down direction. Therefore, it becomes easy to make the pivoting radii of the tie rod 76*a* (76*b*), the shaft portion 44*a* (44*b*), the upper arm 54*a* (54*b*), and the lower arm 56*a* (56*b*) equal or substantially equal to each other, or provide a small difference between the pivoting radii.

It is possible with the ball joint 94 to absorb at least one of the angular tolerance and the axial tolerance in the connecting portion between the first link arm 78*a* (78*b*) and the second link arm 80*a* (80*b*).

It is possible with the metal collars 100, 102 to absorb at least one of the angular tolerance and the axial tolerance in the connecting portion between the second link arm 80*a* (80*b*) and the body frame 22 (the plate member 92).

The connecting portion (the first connecting portion C1 (the second connecting portion C2)) between the tie rod 76*a* (76*b*) and the first link arm 78*a* (78*b*) is located at a more forward position than the connecting portion C11 (C12) between the tie rod 76*a* (76*b*) and the knuckle arm 58*a* (58*b*). The connecting portion (the first connecting portion C1 (the second connecting portion C2)) between the tie rod 76*a* (76*b*) and the first link arm 78*a* (78*b*), and the connecting portion C11 (C12) between the tie rod 76*a* (76*b*) and the knuckle arm 58*a* (58*b*) are located at a more rearward position than a center D1 (D2) of the front wheels 14. The arrangement makes it possible to configure the vehicle 10 so that the front wheels 14 will have a compliance toe-out when subjected to a force from ahead. As a result, the vehicle 10 is able to deflect forces from ahead, making it easier to drive straightly.

In a side view, at least a portion of the connecting portion between the second link arm 80*a* (80*b*) and the body frame 22 (the plate member 92) is located at a higher position than the connecting portion between the pitman arm 74 and the first link arm 78*a* (78*b*). Therefore, it is possible to provide enough space to locate the front differential device 40 below the pitman arm 74.

Preferred embodiments may be suitably applied to an ATV which is configured as described above.

It should be noted here that in the preferred embodiments described above, all of the pitman arm 74, the first link arms 78*a*, 78*b*, and the second link arms 80*a*, 80*b* preferably incline along an upper surface of the front differential device 40 in a side view. However, the present invention is not limited to this. Any one of the pitman arm 74, the first link arms 78*a*, 78*b*, and the second link arms 80*a*, 80*b* may incline along an upper surface of the front differential device 40 in a side view.

In the preferred embodiments described above, the metal collars 100, 102 are utilized to absorb the angular tolerance and/or the axial tolerance at the connecting portion between the second link arm 80*a* (80*b*) and the body frame 22. However, the present invention is not limited to this. Ball joints may be utilized to absorb the angular tolerance and/or the axial tolerance at the connecting portion.

Preferred embodiments of the present invention may also be applicable to ROVs (Recreational Off-Highway Vehicles).

The prime mover is not limited to the engine 30, but may be an electric motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a prime mover supported by the body frame;
   a pair of front wheels;
   a front differential to receive power from the prime mover;
   a pair of constant-velocity joints provided respectively on a left side and a right side of the front differential;
   a pair of shafts each provided between a corresponding one of the pair of constant-velocity joints and a corresponding one of the pair of front wheels in order to transmit power from the front differential to the pair of front wheels via the pair of constant-velocity joints;
a pair of upper arms supported pivotably by the body frame;
a pair of lower arms each located lower than a corresponding one of the pair of upper arms and supported pivotably by the body frame;
a pair of knuckle arms each connecting a corresponding one of the pair of upper arms and a corresponding one of the pair of lower arms to rotatably support a corresponding one of the pair of shafts; and
a steering mechanism to steer the pair of front wheels; wherein
the steering mechanism includes a steering shaft, a pitman arm at a lower end portion of the steering shaft, a pair of tie rods each connected with a corresponding one of the pair of knuckle arms, a pair of first link arms each connecting the pitman arm with a corresponding one of the pair of tie rods, and a pair of second link arms each connecting a corresponding one of the pair of first link arms with the body frame;
a first connector extends between one of the pair of tie rods and a corresponding one of the pair of first link arms;
a second connector extends between the other of the pair of tie rods and a corresponding other of the pair of the first link arms;
a first straight line extends in a fore-aft direction and through the first connector;
a second straight line extends in a fore-aft direction and through the second connector; and
each of the pair of constant-velocity joints includes at least a portion thereof located between the first straight line and the second straight line in a plan view of the vehicle.

2. The vehicle according to claim 1, wherein a third connector extends between one of the pair of first link arms and a corresponding one of the pair of second link arms, a fourth connector extends between the other of the pair of first link arms and a corresponding other of the pair of second link arms, a fifth connector extends between one of the pair of second link arms and the body frame, a sixth connector extends between the other of the pair of second link arms and the body frame, a third straight line extends through the third connector and the fourth connector, a fourth straight line extends through the fifth connector and the sixth connector, and the first connector, the second connector, and at least a portion of the pair of constant-velocity joints are located between the third straight line and the fourth straight line in the plan view.

3. The vehicle according to claim 2, wherein, a fifth straight line extends in a fore-aft direction and through the third connector, and a sixth straight line extends in a fore-aft direction and through the fourth connector, and at least a portion of the front differential is located between the fifth straight line and the sixth straight line in the plan view.

4. The vehicle according to claim 2, wherein at least a portion of the front differential is located in a region surrounded by a rectangle defined by vertices represented by the third connector, the fourth connector, the fifth connector, and the sixth connector in the plan view.

5. The vehicle according to claim 1, wherein the front differential overlaps at least a portion of the steering mechanism in a front view of the vehicle.

6. The vehicle according to claim 1, wherein at least one of the pitman arm, the pair of first link arms, and the pair of second link arms is inclined along an upper surface of the front differential in a side view of the vehicle.

7. The vehicle according to claim 1, further comprising:
a pair of mounting shafts respectively connecting the pair of first link arms with the pair of tie rods; wherein
the pair of mounting shafts extend outward and upward of the vehicle, and the pair of tie rods extend diagonally downward from the pair of first link arms toward the pair of knuckle arms.

8. The vehicle according to claim 1, wherein a connector extending between one of the pair of upper arms and the body frame, a connector extending between one of the pair of lower arms and the body frame, a connector extending between one of the pair of tie rods and one of the pair of first link arms, and one of the pair of constant-velocity joints are located in line in an up-down direction in a front view of the vehicle.

9. The vehicle according to claim 8, wherein the connector extending between the one of the pair of upper arms and the body frame, the connector extending between the one of the pair of tie rods and the one of the pair of first link arms, the constant-velocity joint, and the connector extending between the one of the pair of lower arms and the body frame are located in this order from top to bottom of the vehicle.

10. The vehicle according to claim 1, further comprising a ball joint at a connection between one of the pair of first link arms and one of the pair of second link arms to absorb an angular tolerance and/or an axial tolerance.

11. The vehicle according to claim 1, further comprising a metal collar at a connection between one of the pair of second link arms and the body frame to absorb an angular tolerance and/or an axial tolerance.

12. The vehicle according to claim 1, wherein
the body frame includes a front frame; and
a connector extending between one of the pair of upper arms and the body frame, a connector extending between one of the pair of lower arms and the body frame, a connector extending between one of the pair of tie rods and one of the pair of first link arms, and one of the pair of constant-velocity joints are located substantially outward of the front frame in a front view of the vehicle.

13. The vehicle according to claim 1, wherein
a connector extending between one of the pair of tie rods and one of the pair of first link arms is located farther forward than a connector extending between one of the pair of tie rods and one of the pair of knuckle arms; and
the connector extending between the one of the pair of tie rods and the one of the pair of first link arms, and the connector extending between the one of the pair of tie rods and the one of the pair of knuckle arms are located farther rearward than a center of the front wheel.

14. The vehicle according to claim 1, wherein at least a portion of a connector extending between one of the pair of second link arms and the body frame is located higher than a connector extending between the pitman arm and one of the pair of first link arms in a side view of the vehicle.

15. The vehicle according to claim 1, further comprising:
a straddled seat supported by the body frame; and
a bar handle provided at an upper end portion of the steering shaft.

* * * * *